United States Patent
Hristovski et al.

(10) Patent No.: US 10,435,311 B2
(45) Date of Patent: Oct. 8, 2019

(54) LOW TEMPERATURE SYNTHESIS OF ALUMINUM HYDR(OXIDE) INSIDE POROUS MEDIA

(71) Applicants: Kiril D. Hristovski, Gilbert, AZ (US); Jasmina Markovski, Mesa, AZ (US); Paul K. Westerhoff, Scottsdale, AZ (US); Shahnawaz Sinha, Chandler, AZ (US)

(72) Inventors: Kiril D. Hristovski, Gilbert, AZ (US); Jasmina Markovski, Mesa, AZ (US); Paul K. Westerhoff, Scottsdale, AZ (US); Shahnawaz Sinha, Chandler, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 15/718,074

(22) Filed: Sep. 28, 2017

(65) Prior Publication Data
US 2018/0086648 A1   Mar. 29, 2018

Related U.S. Application Data

(60) Provisional application No. 62/400,923, filed on Sep. 28, 2016.

(51) Int. Cl.
*C02F 1/28* (2006.01)
*B01J 20/28* (2006.01)
(Continued)

(52) U.S. Cl.
CPC .............. *C02F 1/288* (2013.01); *B01J 20/08* (2013.01); *B01J 20/26* (2013.01);
(Continued)

(58) Field of Classification Search
CPC ................ C02F 1/288; C02F 2001/422; C02F 2101/14; C02F 1/285; C02F 1/281;
(Continued)

(56) References Cited

U.S. PATENT DOCUMENTS 9,751,785 B2   9/2017   Doudrick et al.
9,878,320 B2   1/2018   Hristovski et al.
(Continued)

OTHER PUBLICATIONS

Markovski et al. "Nano-enabling of strong-base ion-exchange media via a room temperature aluminum (hydr)oxide synthesis method to simultaneously remove nitrate and fluoride" Science of the Total Environment 599-600 (2017) 1848-1855 (Year: 2017).*
(Continued)

*Primary Examiner* — Peter F Godenschwager
*Assistant Examiner* — Andrew J. Oyer
(74) *Attorney, Agent, or Firm* — Fish & Richardson P.C.

(57) ABSTRACT

Preparing a porous hybrid media includes contacting porous media (e.g., strong base ion-exchange media) with an aqueous solution including aluminum ions to yield a aluminum-ion-containing porous media, contacting the aluminum-ion containing porous media with a reducing agent to impregnate elemental aluminum in the porous media, and oxidizing the elemental aluminum to yield a porous hybrid media including aluminum hydr(oxide) impregnated in the porous media. In some cases, a pH of an aqueous mixture including the aluminum-ion-containing porous media may be adjusted to form a floc including aluminum hydroxide, and the aluminum hydroxide-containing porous media may be contacted with a reducing agent to yield a porous hybrid media including aluminum hydr(oxide) impregnated in the porous media. The porous hybrid media may advantageously be prepared at low temperature (e.g., room temperature).

9 Claims, 9 Drawing Sheets

(51) Int. Cl.
*B01J 20/08* (2006.01)
*B01J 20/32* (2006.01)
*B01J 20/26* (2006.01)
*C02F 1/42* (2006.01)
C02F 101/16 (2006.01)
C02F 101/14 (2006.01)

(52) U.S. Cl.
CPC ..... *B01J 20/28026* (2013.01); *B01J 20/3208* (2013.01); *B01J 20/3236* (2013.01); *C02F 1/281* (2013.01); *C02F 1/285* (2013.01); *C02F 2001/422* (2013.01); *C02F 2101/14* (2013.01); *C02F 2101/163* (2013.01)

(58) Field of Classification Search
CPC ............. C02F 2101/163; B01J 20/3208; B01J 20/3236; B01J 20/28026; B01J 20/26; B01J 20/08
See application file for complete search history.

(56) References Cited

U.S. PATENT DOCUMENTS

| 2013/0175220 A1 | 7/2013 | Hristovski et al. |
| 2016/0334311 A1 | 11/2016 | Westerhoff et al. |
| 2017/0313601 A1 | 11/2017 | Westerhoff et al. |
| 2018/0080148 A1 | 3/2018 | Westerhoff et al. |

OTHER PUBLICATIONS

US EPA., "Water Treatment Technology Feasibility Support Document for Chemical Contaminants; In Support of EPA Review of National Primary Drinking Water Regulations", US EPA, 2003, EPA #815-R-03-004.

Vuhahula, E. et al., "Dental fluorosis in Tanzania Great Rift Valley in relation to fluoride levels in water and in 'Magadi' (Trona)", Desalination, Nov. 2009 (available online Nov. 2009), vol. 248, No. 1-3, pp. 610-615 <DOI:10.1016/j.desal.2008.05.109>.

Westerhoff, P. et al., ". Overcoming implementation barriers for nanotechnology in drinking water treatment", Environmental Science: Nano, Sep. 2016, vol. 3, No. 6, pp. 1241-1253 <DOI:10.1039/C6EN00183A>.

Westerhoff, P. et al., "Nitrates in groundwater: treatment technologies for today and tomorrow", Southwest Hydrology, Jul.-Aug. 2009, vol. 8, pp. 30-37.

Williams, A. et al., "Spatial and temporal variations in nitrate contamination of a rural aquifer, California", Journal of Environmental Quality, Sep. 1998, vol. 27, No. 5, pp. 1147-1157 <DOI:10.2134/jeq1998.00472425002700050021x>.

Winkler, B. et al., "Modification of the surface characteristics of anodic alumina membranes using sol-gel precursor chemistry", Journal of Membrane Science, Dec. 2003 (available online Nov. 2003), vol. 226, No. 1-2, pp. 75-84 <DOI:10.1016/j.memsci.2003.07.015>.

Yang, C. et al., "Fluoride removal by ordered and disordered mesoporous aluminas", Microporous and Mesoporous Materials, Oct. 2014 (available online Jun. 2014), vol. 197, pp. 156-163 <DOI:10.1016/j.micromeso.2014.06.010>.

Zhan, H. et al., "An assessment of nitrate occurrence and transport in Washoe Valley, Nevada". Environmental and Engineering Geoscience, Jan. 1998, vol. 4, No, 4, pp. 479-489 <DOI:10.2113/gseegeosci.IV.4.479>.

Zhang, W. et al. "Nitrate pollution of groundwater in northern China", Agriculture, Ecosystems & Environment, Oct. 1996, vol. 59, No. 3, pp. 223-231 <DOI:10.1016/0167-8809(96)01052-3>.

Abe, I. et al., "Adsorption of fluoride ions onto carbonaceous materials", Journal of Colloid and Interface Science, Jul. 2004, vol. 275, No. 1, pp. 35-39 <DOI:10.1016/j.jcis.2003.12.031>.

Adelman, D. et al., "Potential impact of soil carbon content on groundwater nitrate contamination", Water Science and Technology. Feb. 1996. vol. 33, No. 4-5, pp. 227-232 <DOI:10.1016/0273-1223(96)00235-1>.

Alabdula'Aly, A. et al., "Assessment of nitrate concentration in groundwater in Saudi Arabia", Environmental Monitoring and Assessment, Feb. 2010 (available online Jan. 2009), vol. 161, No. 1-4, pp. 1-9 <DOI:10.1007/s10661-008-0722-7>.

Berg, P., "The World's Need for Household Water Treatment", Journal of the American Water Works Association, Oct. 2015, vol. 107, No. 10, pp. 36-44 <DOI:10.5942/jawwa.2015.107.0144>.

Bhargava, D. et al, "Fluoride adsorption on fishbone charcoal through a moving media adsorber", Water Research, Jun. 1992, vol. 26, No. 6, pp. 781-788 <DOI:10.1016/0043-1354(92)90009-S>.

Brame, J. et al., "Nanotechnology enabled water treatment and reuse: emerging opportunities and challenges for developing countries", Trends in Food Science & Technology, Nov. 2011, vol. 22, No. 11, pp. 618-624 <DOI:10.1016/j.tifs.2011.01.004>.

Camargo, J., "Fluoride toxicity to aquatic organisms: a review", Chemosphere, Jan. 2003, vol. 50, No. 3, pp. 251-264 <DOI:10.1016/S0045-6535(02)00498-8.

Crews, T. et al., "Legume versus fertilizer sources of nitrogen: ecological tradeoffs and human needs", Agriculture, Ecosystems & Environment, May 2004, vol. 102, No. 3, pp. 279-297 <DOI:10.1016/j.agee.2003.09.018>.

Cristiano, E. et al., "A comparison of point of zero charge measurement methodology", Clays and Clay Materials, Apr. 2011, vol. 59, No. 2, pp. 107-115 <DOI:10.1346/CCMN.2011.0590201>.

Dale, S. et al., "Modeling packed bed sorbent systems with the pore surface diffusion model: evidence of facilitated surface diffusion of arsenate in nano-metal (hydr)oxide hybrid ion exchange media", Science of the Total Environment, Sep. 2016 (available online Dec. 2015), vol. 563-564, pp. 965-970 <DOI:10.1016/j.scitotenv.2015.11.176>.

Garcia, J. et al., "The effect of metal (hydr)oxide nano-enabling on intraparticle mass transport of organic contaminants in hybrid granular activated carbon", Science of the Total Environment, May 2017 (available online Feb. 2017), vol. 586, pp. 1219-1227 <DOI:10.1016/j.scitotenv.2017.02.115>.

George, M. et al., "Incidence and geographical distribution of sudden infant death syndrome in relation to content of nitrate in drinking water and groundwater levels", European Journal of Clinical Investigation, Dec. 2001, vol. 31, No. 12, pp. 1083-1094 <DOI:10.1046/j.1365-2362.2001.00921.x>.

Ghorai, S. et al., "Investigations on the column performance of fluoride adsorption by activated alumina in a fixed-bed", Chemical Engineering Journal, Mar. 2004, vol. 98, No. 1-2, pp. 165-173 <DOI:10.1016/j.cej.2003.07.003>.

Gifford, F., "Sustainable Drinking Water Treatment: Using Weak Base Anion Exchange Sorbents Embedded With Metal Oxide Nanoparticles to Simultaneously Remove Multiple Oxoanions", Arizona State University, Dissertation in Partial Fulfillment of the Requirements for the Degree Doctor of Philosophy, May 2016, 294 pages.

Gong, W-X. et al., "Adsorption of fluoride onto different types of aluminas", Chemical Engineering Journal, May 2012 (available online Feb. 2012), vol. 189-190, pp. 126-133 <DOI:10.1016/j.cei.2012.02.041>.

Guillette, L., "Endocrine disrupting contaminants—beyond the dogma", Environmental Health Perspectives, Apr. 2006, vol. 114, pp. 9-12 <DOI:10.1289/ehp.8045>.

Haida, L. et al., "Effect of Self-Dispersion Nanosized Aiooh on Microstructure and Wear Resistance of Alumina Ceramic Balls", Materials Transactions, Jul. 2008, vol. 49, No. 8, pp. 1863-1867 <DOI:10.2320/matertrans.MRA2008061>.

Hao, J. et al., "Preparation and evaluation of thiol-functionalized activated alumina for arsenite removal from water", Journal of Hazardous Materials. Aug. 2009 (available online Feb. 2009), vol. 167, No. 1-3, pp. 1215-1221 <DOI:10.1016/j.jhazmat.2009.1.124>.

Hristovski, K. et al., "Arsenate Removal by Nanostructured ZrO2 Spheres", Environmental Science & Technology, Apr. 2008, vol. 42, No. 10, pp. 3786-3790 <DOI:10.1021/es702952p>.

(56) References Cited

OTHER PUBLICATIONS

Hristovski, K. et al., "Engineering metal (hydr)oxide sorbents for removal of arsenate and similar weak-acid oxyanion contaminants: a critical review with emphasis on factors governing sorption processes", Science of the Total Environment, Nov. 2017 (available online Apr. 2017), vol. 598, pp. 258-271 <DOI:10.1016/j.scitotenv.2017.04.108>.

Indermitte, E. et al., "Reducing Exposure to High Fluoride Drinking Water in Estonia—a Countrywide Study", International Journal of Environmental Research and Public Health, Mar. 2014, vol. 11, No. 3, pp. 3132-3142 <DOI:10.3390/ijerph110303132>.

Jaeger, J. et al., "Endocrine, immune, and behavioral effects aldicarb (carbamate), atrazine (trianzine) and nitrate (fertilizer) mixtures at groundwater concentrations", Toxicology and Industrial Health, 1999, vol. 15, pp. 133-151.

Kosmulski, M., "pH-dependent surface charging and points of zero charge III. Update", Journal of Colloid and Interface Science, Jun. 2006 (available online Feb. 2006), vol. 298, No. 2, pp. 730-741 <DOI:10.1016/j.jcis.2006.01.003>.

Ku, Y. et al., "The Adsorption of Fluoride Ion from Aqueous Solution by Activated Alumina", Water, Air, and Soil Pollution, Jan. 2002, vol. 133, No. 1-4, pp. 349-361 <DOI:10.1023/A:1012929900113>.

Kumar, E. et al., "Defluoridation from aqueous solutions by nano-alumina: Characterization and sorption studies", Journal of Hazardous Materials, Feb. 2011 (available online Dec. 2010), vol. 186, No, 2-3, pp. 1042-1049 <DOI:10.1016/j.jhazmat.2010.11.102>.

Lee, G. et al., "Enhanced adsorptive removal of fluorideusing mesoporous alumina", Microporous and Mesoporous Materials, Jan. 2010 (available online Jul. 2009), vol. 127, No. 1-2, pp. 152-156 <DOI:10.1016/j.micromeso.2009.07.007>.

Levallois, P. et al., "Sources of nitrate exposure in residents of rural areas in Quebec, Canada", Journal of Exposure Science & Environmental Epidemiology, May 2000, vol. 10, No. 2, pp. 188-195 <DOI:10.1038/sj.jea.7500079>.

Marcus, Y., "Thermodynamics of solvation of ions. Part 5.—Gibbs free energy of hydration at 298.15 K", Journal of the Chemical Society, Faraday Transactions, 1991, vol. 87, No. 18, pp. 2995-2999 <DOI:10.1039/FT9918702995>.

Markovski, J. et al., "Nano-enabling of strong-base ion-exchange media via a room-temperature aluminum (hydr) oxide synthesis method to simultaneously remove nitrate and fluoride", Science of the Total Environment, Dec. 2017 (available online May 2017), vol. 599-600, pp. 1848-1855 <DOI:10.1016/j.scitotenv.2017.05.083>.

Markovski, J. et al., "Simultaneous removal of fluoride and nitrate by ion exchange media impregnated with alumina nanoparticles", presented at the 252nd American Chemical Society National Meeting (Philadelphia, PA, Aug. 21-25, 2016), ENVR 358.

Meenakshi, M. et al., "Fluoride in drinking water and its removal", Journal of Hazardous Materials, Sep. 2006 (available online Feb. 2006), vol. 137, No. 1, pp. 456-463 <DOI:10.1016/j.jhazmat.2006.02.024>.

Mohapatra, M. et al., "Review of fluoride removal from drinking water", Journal of Environmental Management, Oct. 2009 (available online Sep. 2009), vol. 91, No. 1, pp. 67-77 <DOI:10.1016/j.jenvman.2009.08.015>.

Nolan, B. et al., "Nutrients in Groundwaters of the Conterminous United States, 1992-1995", Environmental Science & Technology, Feb. 2000, vol. 34, No. 7, pp. 1156-1165 <DOI:10.1021/es9907663>.

Nolan, B. et al., "Predicting Unsaturated Zone Nitrogen Mass Balances in Agricultural Settings of the United States", Journal of Environmental Quality Abstract, May 2010, vol. 39, No. 3. pp. 1051-1065 <DOI:10.2134/jeq2009.0310>.

Nolan, B. et al., "Vulnerability of Shallow Groundwater and Drinking-Water Wells to Nitrate in the United States", Environmental Science & Technology, Oct. 2006, vol. 40, No. 24, pp. 7834-7840 <DOI:10.1021/es060911u>.

Parida, K. et al., "Synthesis and characterization of nano-sized porous gamma-alumina by control precipitation method", Materials Chemistry and Physics, Jan. 2009(available online Aug. 2008), vol. 113, No. 1, pp. 244-248 <DOI:10.1016/j.matchemphys.2008.07.076>.

Phantumvanit, P. et al., "Characteristics of bone char related to efficacy of fluoride removal from highly fluoridated water", Fluoride, 1997, vol. 30, No. 4, pp. 207-218.

Raun, W. et al., "Improving nitrogen use efficiency for cereal production", Agronomy Journal, May-Jun. 1999, vol. 91, No. 3, pp. 357-363.

Rengaraj, S. et al., "Kinetics of adsorption of Co(II) removal from water and wastewater by ion exchange resins", Water Research, Apr. 2002, vol. 36, No. 7, pp. 1783-1793 <DOI:10.1016/S0043-1354(01)00380-3>.

Reves-Gallardo, E. et al., "Hybridization of commercial polymeric microparticles and magnetic nanoparticles for the dispersive micro-solid phase extraction of nitroaromatic hydrocarbons from water", Journal of Chromatography A, Jan. 2013 (available online Nov. 2012), vol. 1271, No. 1, pp. 50-55 <DOI:10.1016/j.chroma.2012.11.040>.

Rožić, L. et al., "The kinetics of the partial dehydration of gibbsite to activated alumina in a reactor for pneumatic transport", Journal of the Serbian Chemical Society, Apr. 2001, vol. 66, No. 4; pp. 273-280 <DOI:10.2298/JSC0104273R>.

Sandoval, R. et al., "Removal of arsenic and methylene blue from water by granular activated carbon media impregnated with zirconium dioxide nanoparticles", Journal of Hazardous Waste, Oct. 2011 (available online Aug. 2011), vol. 193, pp. 296-303 <DOI:10.1016/jpazmat.2011.07.061>.

Sarkar, S. et al., "Use of ArsenXnp, a hybrid anion exchanger, for arsenic removal in remote villages in the Indian subcontinent", Reactive and Functional Polymers, Dec. 2007 (available online Aug. 2007), vol. 67. No. 12, pp. 1599-1611 <DOI:10.1016/j.reactfunctpolym.2007.07.047>.

Schoeman, H. et al., "The effect of particle size and interfering ions on fluoride removal by activated alumina". Water SA, Aug. 1987, vol. 13, No. 4, pp. 229-234.

Shek, C. et al., "Transformation evolution and infrared absorption spectra of amorphous and crystalline nano-$Al_2O_3$ powders", Nanostructured Materials, Aug. 1997, vol. 8, No. 5, pp. 605-610 <DOI:10.10161S0965-9773(97)00201-8>.

Smet, J. et al.. "Endemic Fluorosis in Developing Countries-Causes, Effects and Possible Solution", Netherlands Organization for Applied Scienctific Research: Report of a Symposium (Delft, The Netherlands. Apr. 27th, 1990), 1990, 110 pages.

Sylvester-Bradley, R. et al., "Scope for more efficient use of fertilizer nitrogen", Soil Use and Management, Sep. 1993, vol. 9, No. 3, pp. 112-117 <Doi:10.1111/j.1475-2743.1993.tb00939.x>.

Thorburn, P. et al., "Nitrate in groundwaters of intensive agricultural areas in coastal Northeastern Australia", Agriculture, Ecosystems & Environment, Jan. 2003, vol. 94, No. 1, pp. 49-58 <DOI:10.1016/S0167-8809(02) 00018-X>.

Uma, K., "Nitrates in shallow (regolith) aquifers around Sokoto Town, Nigeria", Environmental Geology, Apr. 1993, vol. 21, No. 1-2, pp. 70-76 <DOI:10.1007/BF00775053>.

US EPA., "Fact Sheet: National Primary Drinking Water Standards", US Government Printing Office (Washington, DC), 1991.

* cited by examiner

LOW TEMPERATURE SYNTHESIS OF ALUMINUM HYDR(OXIDE) INSIDE POROUS MEDIA

CROSS-REFERENCE TO RELATED APPLICATION

This application claims the benefit of U.S. Application Ser. No. 62/400,923 entitled "LOW TEMPERATURE SYNTHESIS OF ALUMINUM OXIDE INSIDE POROUS MEDIA" and filed on Sep. 28, 2016, which is incorporated by reference herein in its entirety.

STATEMENT OF GOVERNMENT INTEREST

This invention was made with government support under 1449500 awarded by the National Science Foundation. The government has certain rights in the invention.

TECHNICAL FIELD

This invention relates to low temperature synthesis of aluminum hydr(oxide) inside porous media, the resulting hybrid media, and its use for simultaneous removal of multiple contaminants from water.

BACKGROUND

Activated alumina ($Al_2O_3$) is widely used as a desiccant, catalyst, and selective adsorbent for water and gas contaminants. $Al_2O_3$ is typically synthesized from gibbsite ($Al(OH)_3$), or materials containing gibbsite, by slow or flash dihydroxylation at temperatures exceeding 400° C. The resulting $Al_2O_3$ is in the form of fine mesoporous particles with poor physical integrity, having limited effectiveness in water treatment processes. To facilitate use in fixed bed reactor configurations, $Al_2O_3$ is usually aggregated in beads. Nevertheless, problems related to adsorbent stability, attrition, surface area decrease, and porosity reduction remain. In addition, the high temperatures typically employed in calcination of aluminum to yield $Al_2O_3$ limit the feasibility of forming hybrid media including $Al_2O_3$ by such methods.

SUMMARY

In a first general aspect, preparing a porous hybrid media includes contacting porous media with an aqueous solution including aluminum ions to yield a mixture, adjusting a pH of the mixture to form a floc including aluminum hydroxide, removing liquid from the mixture to yield aluminum hydroxide-containing porous media, and contacting the aluminum hydroxide-containing porous media with a reducing agent to yield a porous hybrid media including aluminum hydr(oxide) impregnated in the porous media.

Implementations of the first general aspect may include one or more of the following features.

The aluminum ions may be derived from aluminum chloride. The reducing agent may include borohydride. Adjusting the pH of the mixture typically includes increasing the pH of the mixture to less than six (e.g., between 4 and 6). Adjusting the pH of the mixture may further include, after increasing the pH of the mixture to less than 6, increasing the pH of the mixture to greater than 6 and less than 8. Preparing the porous hybrid media may occur at room temperature or a temperature less than about 40° C. The porous media may include strong base ion-exchange media. The aluminum content of the porous hybrid media is typically between 3 wt % and 4 wt % of the porous hybrid media. The aluminum hydr(oxide) includes $\gamma$-$Al_2O_3$, amorphous $Al_2O_3$, amorphous $AlO(OH)$, or a combination thereof.

A second general aspect includes the porous hybrid media prepared by the first general aspect.

In a third general aspect, preparing a porous hybrid media includes contacting porous media with an aqueous solution including aluminum ions to yield a aluminum-ion-containing porous media, contacting the aluminum-ion containing porous media with a reducing agent to impregnate elemental aluminum in the porous media, and oxidizing the elemental aluminum to yield a porous hybrid media including aluminum hydr(oxide) impregnated in the porous media.

Implementations of the third general aspect may include one or more of the following features.

The aluminum ions may be derived from aluminum chloride. The reducing agent may include borohydride. Preparing the porous hybrid media may occur at room temperature or a temperature less than about 40° C. The porous media may include strong base ion-exchange media. The aluminum content of the porous hybrid media is typically between 2 wt % and 3 wt % of the porous hybrid media. The aluminum hydr(oxide) includes $\gamma$-$Al_2O_3$, amorphous $Al_2O_3$, amorphous $AlO(OH)$, or a combination thereof. Oxidizing the elemental aluminum includes contacting the elemental aluminum with oxygen, such as oxygen in the air or in an aqueous solution.

A fourth general aspect includes the porous hybrid media prepared by the third general aspect.

Advantages include preparation of hybrid media containing aluminum hydr(oxide) at low temperature (e.g., room temperature), thereby avoiding elevated temperatures detrimental to the porous media. The resulting porous hybrid media is able to remove multiple contaminants from water simultaneously, including one or more of weak acid anions (e.g., fluoride and nitrate) and strong acid anions (for porous media including various ion exchange resins), organic contaminants (for porous media including activated carbon), and specific cations and weak acid anions such as fluoride (for porous media including cation exchange resins).

DETAILED DESCRIPTION

A low-temperature method for synthesizing aluminum (hydr)oxide material inside porous media to fabricate porous hybrid media capable of removing nitrate and fluoride from aqueous media, such as contaminated groundwater, is described. As used herein, "aluminum hydr(oxide)" refers to aluminum oxyhydroxide (AlO(OH)), aluminum oxide ($Al_2O_3$), or both. "Low temperature" generally includes a temperature in a range of 0-40° C., such as room temperature or. In some cases, "low temperature" includes a temperature less than a temperature at which a structure or function of the porous media is deformed or destroyed, respectively. Suitable porous media include strong base ion-exchange resin and weak base ion-exchange resin, activated carbon, siliceous material based media, or other similar porous metal oxide media.

Figure 1A:
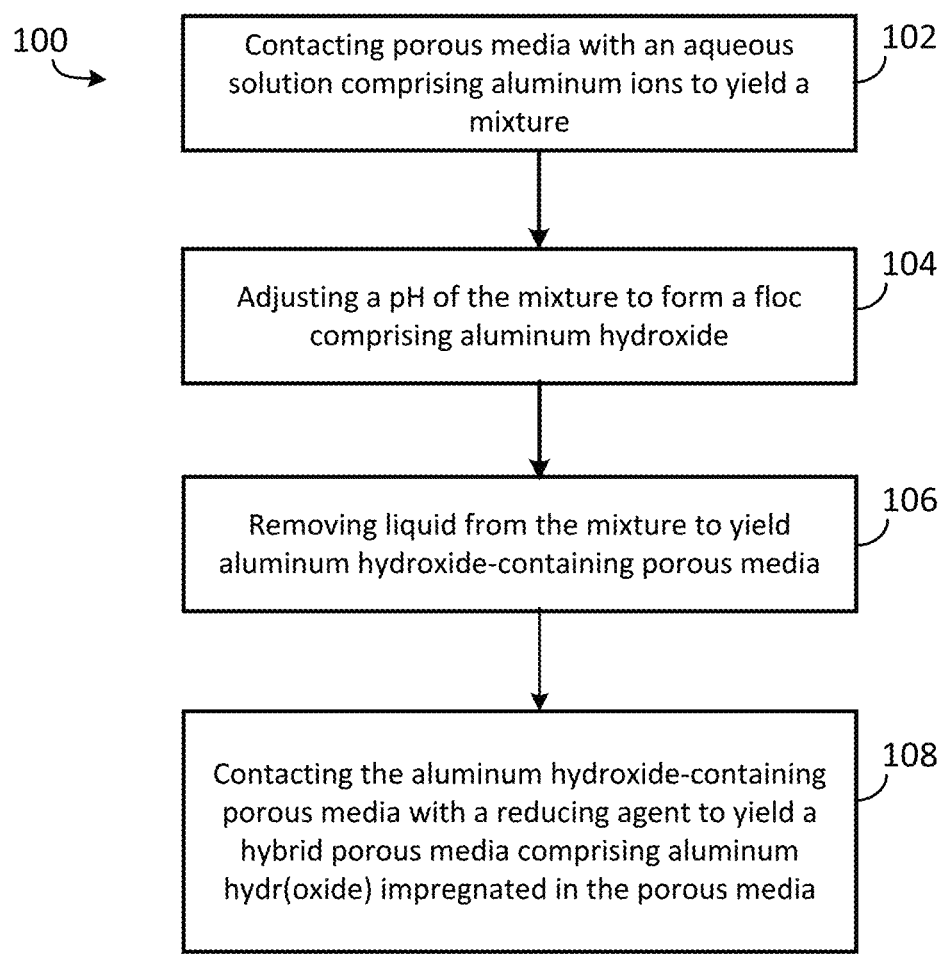
FIGS. 1A and 1B are flowcharts describing processes for low temperature synthesis of aluminum hydr(oxide) inside porous media.

Process 100 for low-temperature synthesis of porous hybrid media is depicted in the flowchart of FIG. 1A. In 102, porous media is contacted with an aqueous solution including aluminum ions to yield a mixture. The porous media may be wet before it is contacted with the aqueous solution including aluminum ions, thereby promoting diffusion of the aluminum ions into the porous media. The wet porous media may be prepared by soaking in water (e.g., ultrapure water) for a length of time (e.g., up to 24 hours) to achieve a desired moisture content (e.g., a maximum moisture content). In some cases, the mixture is agitated (e.g., stirred) for a length of time (e.g., up to 24 hours). The aqueous solution including aluminum ions may be saturated. In general, the resulting aluminum hydr(oxide) content of the porous hybrid media depends on the aluminum ion concentration, with higher aluminum ion concentration yielding higher aluminum hydr(oxide) content. Aluminum ions in the aqueous solution may be derived from salts such as aluminum chloride, aluminum sulfate, aluminum fluoride, aluminum nitrate, or a combination thereof.

In some cases, a pH of the mixture is adjusted to below 6 (e.g., to about 4.5) or above 8 to inhibit floc formation and allow aluminum ions to enter pores in the porous media over a length of time (e.g., up to 24 hours). In 104, a pH of the mixture is adjusted to form a floc including aluminum hydroxide. A floc is typically formed when the pH of the mixture is adjusted to a pH in a range of 6 to 8. The floc "locks" the aluminum inside the pores of the porous media. As used herein, "floc" generally refers to a flocculent mass formed by the aggregation of suspended particles. The pH of the mixture may be adjusted by adding an aqueous solution of a base. Examples of suitable bases include sodium hydroxide, potassium hydroxide, and the like.

In 106, liquid is removed from the mixture to yield aluminum hydroxide-containing porous media. In 108, the aluminum hydroxide-containing porous media is contacted with a reducing agent to yield a porous hybrid media including aluminum hydr(oxide) impregnated in the porous media. The reducing agent is typically in an aqueous solution. Suitable reducing agents include $NaBH_4$, $LiBH_4NaAlH_4$, $KAlH_4$, and the like. The aluminum content of the porous hybrid media is typically at least 3 wt % (e.g., between 3 wt % and 5 wt %, or between 3 wt % and 4 wt %) of the porous hybrid media. At least some of the aluminum hydr(oxide) may be in the form of nanoparticles.

In some cases, the aluminum hydr(oxide) includes $γ-Al_2O_3$, amorphous $Al_2O_3$, AlO(OH), or a combination thereof. The resulting porous hybrid media may be washed with water to achieve a neutral pH (e.g., a pH above 4.5, or about 7). In some cases, the porous hybrid media is stored under water after washing.

Figure 1B:
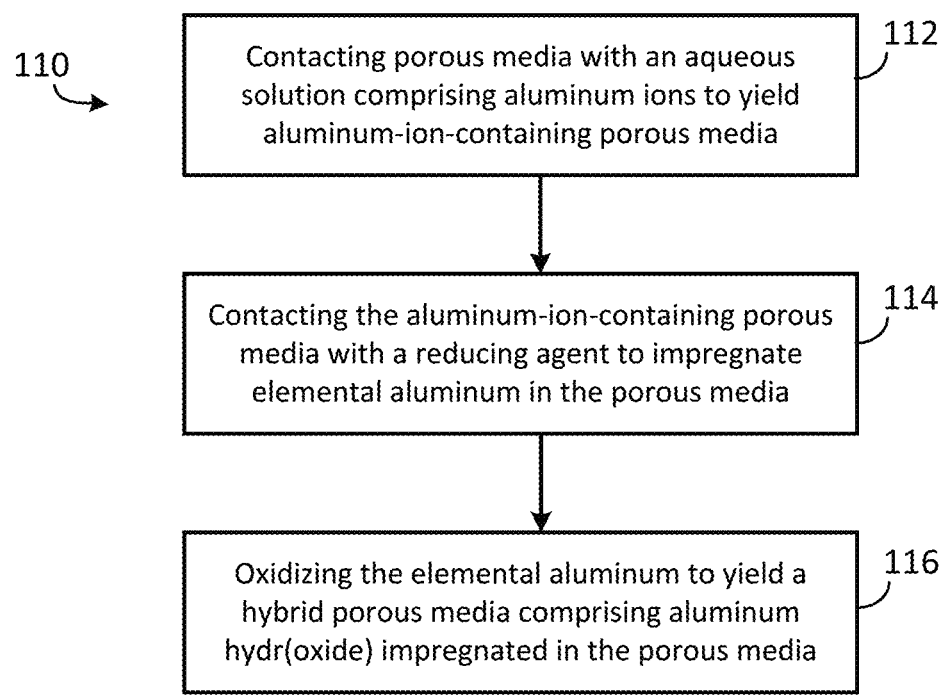

Process 110 for low-temperature synthesis of porous hybrid media is depicted in the flowchart of FIG. 1B. In 112, porous media is contacted with an aqueous solution including aluminum ions to yield an aluminum-ion-containing porous media. The porous media may be wet before it is contacted with the aqueous solution including aluminum ions, thereby promoting diffusion of the aluminum ions through pores in the porous media. The wet porous media may be prepared by soaking in water (e.g., ultrapure water) for a length of time (e.g., up to 24 hours) to achieve a desired moisture content (e.g., a maximum moisture content). In some cases, the wet porous media and the aqueous solution including aluminum ions are agitated (e.g., stirred) for a length of time (e.g., up to 24 hours). The aqueous solution including aluminum ions may be saturated. In general, the resulting aluminum hydr(oxide) content in the porous hybrid media depends on the aluminum ion concentration, with higher aluminum ion concentration yielding higher aluminum hydr(oxide) content. Aluminum ions in the aqueous solution may be derived from salts such as aluminum chloride, aluminum sulfate, aluminum fluoride, aluminum nitrate, or a combination thereof.

In 114, the aluminum-ion containing porous media is contacted with a reducing agent to impregnate elemental aluminum in the porous media. The reducing agent is typically in an aqueous solution. Suitable reducing agents include $NaBH_4$, $LiBH_4NaAlH_4$, $KAlH_4$, and the like.

In 116, the elemental aluminum is oxidized to yield a porous hybrid media including aluminum hydr(oxide) impregnated in the porous media. Oxidizing the elemental aluminum includes contacting the elemental aluminum with oxygen. The oxygen is typically environmental oxygen, such as oxygen in the air or oxygen dissolved in water or an aqueous solution. The aluminum content of the porous hybrid media is at least 2 wt % (e.g., between 2 wt % and 4 wt %, or between 2 wt % and 3 wt %) of the porous hybrid media. At least some of the aluminum hydr(oxide) may be in the form of nanoparticles. In some cases, the aluminum hydr(oxide) includes $γ-Al_2O_3$, amorphous $Al_2O_3$, or a combination thereof. The resulting porous hybrid media may be washed with water to achieve a neutral pH (e.g., a pH above 4.5, or about 7). In some cases, the porous hybrid media is stored under water after washing.

In some cases, metal salts, such as titanium salts, are introduced into the porous hybrid media to yield improved sorbent properties or selectivity for specific contaminants. Porous hybrid media described herein may be used in fixed bed reactor configurations for small treatment systems, such as household treatment systems.

Figure 2:
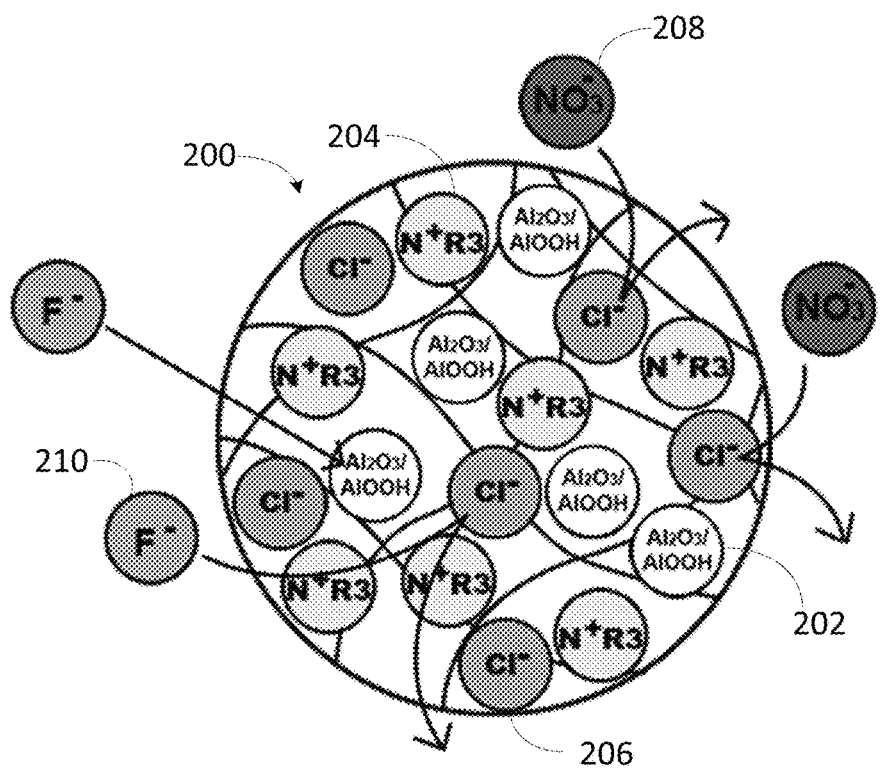
FIG. 2 depicts porous hybrid media described herein.

FIG. 2 depicts porous hybrid media particle 200 defining a multiplicity of pores. Some pores in porous hybrid media particle 200 are impregnated with aluminum hydr(oxide) 202. At least some of the aluminum hydr(oxide) may be in the form of nanoparticles. Some pores in porous hybrid media particle 200 may include quaternary amines 204. Quaternary amines 204 may restrict access to larger oxyanions (e.g., nitrate and sulfate), while still allowing for ion exchange of smaller anions, such as fluoride. Some pores in porous hybrid media particle 200 may include chloride 206. Nitrate 208 and fluoride 210 may diffuse into porous hybrid media particle 200, displacing chloride 206. Aluminum (hydr)oxide 202 also functions as a sorbent for the fluoride ions. With an increase in aluminum content in porous hybrid media particle 200, the number of available sorption sites increases, improving fluoride sorption capacity and also accommodating co-contaminant removal.

EXAMPLE

Aluminum (hydr)oxide was synthesized at a room temperature by reducing aluminum ion precursor with sodium borohydride in ultrapure water. To ensure complete reduction of the aluminum, borohydride was provided in excess of the stoichiometric requirements. The same process was employed to synthesize aluminum (hydr)oxide inside the pores of commercially-available nitrate selective strong base ion-exchange (IX) resin (Purolite A520E).

Before the modification with aluminum (hydr)oxide, the virgin ion-exchange media was soaked in water to expand the resin, open its macropores, and improve diffusion of the aluminum ions. The excess water was then decanted, and 100 g of wet resin was mixed with a saturated solution of the aluminum salt precursor, prepared by dissolving 55 g of $AlCl_3 \times 6H_2O$ in 50 mL of water. The aluminum cations, with free liquid diffusivity of $D_1=5.41 \times 10^{-6}$ cm$^2$ s$^{-1}$ in water at 25° C., diffuse into the pores and establish equilibrium with the bulk within minutes to hours of creating a high concentration gradient. Nonetheless, to ensure comprehensive diffusion of the aluminum ions inside the pores, the ion-exchange media and aluminum solution were gently mixed for 1 day. The ion-exchange resin primed with aluminum ions was then divided equally into two portions, and two synthesis approaches were undertaken to fabricate two different types of aluminum (hydr)oxide hybrid media.

In the first synthesis approach, as described with respect to FIG. 1B, the excess aluminum solution was decanted and the aluminum ions inside the pores of the primed resin were reduced by adding 50 mL solution containing 10 g of $NaBH_4$. In the second synthesis approach, as described with respect to FIG. 1A, the aluminum ion primed resin was contacted with NaOH until stable white $Al(OH)_3$ floc formed (pH>4.5). The underlying premise for this step was to form large floc inside the resin macropores to minimize aluminum leaching from the resin during the subsequent reduction step and consequently contribute to higher aluminum (hydr) oxide content in the hybrid media. Upon stable floc formation, the media was left to equilibrate for 1 day and ensure stable floc and pH before the excess floc was decanted and 50 mL of the $NaBH_4$ solution were introduced to reduce the trapped aluminum. In both synthesis approaches, the media was gently mixed with the reducing agent for 2 h before rinsing the hybrid media with ultrapure water until the decanted solution exhibited pH~7. Both media were stored in ultrapure water before characterization and use. The hybrid media synthesized via the first approach was termed Al-HIX-2, while its counterpart hybrid media was termed Al-HIX-4.

High resolution X-ray diffraction (XRD) analysis (PANalytical X'Pert Pro, CuKα source) was employed to confirm aluminum (hydr)oxide formation and determine the presence of crystalline phases and structural characteristics. Focused ion beam and scanning electron microscopy (FIB/SEM) techniques (Nova 200 NanoLab UHR FEG-SEM/FIB and XL 30 by FEI) were used to determine the size and shape of the aluminum (hydr)oxide material deposited within the pores of both hybrid (Al-HIX) media. The aluminum distribution throughout the hybrid Al-HIX media was evaluated by energy dispersive X-ray (EDS) elemental mapping. The FIB/SEM and EDS analyses were also performed on the untreated IX resin, which served as a baseline for comparison with the hybrid media.

Gravimetric analysis at 700° C. was employed to determine the aluminum content of the Al-HIX media and confirm the absence of aluminum in the untreated IX resin. Particle densities and porosities of the Al-HIX and IX resins, and conventional activated alumina (AA) (AA-400G, 28×48 mesh, Alcan) were determined via pycnometer analysis. For Al-HIX and IX resins, specific surface area was determined via the Brunauer-Emmet-Teller (BET) method, and their pore size distribution was obtained via the Barret-Joyner-Halenda (BJH) method using MicroMeritics Tristar-II 3020 automated gas adsorption analyzer within the working range of the instrument (from 1.7 to 300 nm).

The iso-electric point ($pH_{PZC}$) was determined via pH drift method after 3 days equilibration in 10 mM KCl background electrolyte solution. For porous and large media that require longer time for equilibration, this method can be advantageous compared to titration or electrophoresis methods.

To gain insight into the density of aluminum sites created in the hybrid Al-HIX media, the change in concentration of protons resulting from aluminum (hydr)oxide impregnation inside the ion-exchange media was calculated and normalized per dry weight and surface area of Al-HIX-2 and Al-HIX-4 media. The difference in iso-electric points of the hybrid and virgin media was used to estimate the generation of new positive sites, and BET data was utilized for the specific surface area.

Short-bed column (SBC) tests with sufficient bed depth to capture the entire mass transfer zone when operated at hydraulic loading rates of full-scale systems were used to assess contaminant removal performance of all media under continuous-flow conditions. The SBC tests were conducted in glass columns ($d_{Column}=1.5$ cm) packed with ~14.6 cm of media. The realistic hydraulic loading rate of 1.52 L s$^{-1}$ m$^{-2}$ (2.22 gal min$^{-1}$ ft$^{-2}$) was applied, which enabled capturing the mass transfer zones for both contaminants at an empty bed contact time (EBCT) of 1.6 min.

The continuous-flow column tests were conducted with fluoride and nitrate as model contaminants to estimate each media's contaminant removal performance. The continuous-flow tests were conducted in two water matrices: (1) a simple matrix consisting of nitrate and fluoride in ultrapure water buffered with 10 mM $NaHCO_3$; and (2) a complex matrix of NSF 53 challenge water that simulates realistic and challenging groundwater conditions (NSF/ANS, 2007). Both water matrices were spiked with 12 mg (F) L$^{-1}$ and 20 mg ($NO_3$—N) L$^{-1}$, which represent realistic conditions exceeding the MCLs for these contaminants. The pH was corrected with HCl to realistic conditions ($pH_{FINAL}=7.1\pm0.1$). Fluoride and nitrate concentrations were analyzed using an ion chromatography instrument (Thermo scientific, Dionex ICS-1100).

The contaminant removal performance of conventional activated alumina was also tested under the same conditions to compare the performance of the newly fabricated Al-HIX media with commercially available BAT for fluoride removal. Additionally, to closely evaluate the effect of aluminum on fluoride sorption, breakthrough curves of Al-HIX-2, Al-HIX-4, and AA media were normalized per aluminum content.

For both fluoride and nitrate, the contaminant removal performance at 95% ($q_{95}\%$) breakthrough ($C_{eff}/C_0=0.95$), which is considered complete contaminant breakthrough from an operational perspective, was estimated via Eq. (1):

$$q_{95\%} = \frac{Q \times \int_0^t C(t)dt}{m} \quad (1)$$

where $q_{95}\%$ is the sorption capacity of the dry media (mg g$^{-1}$), Q is the flowrate in the packed-bed (L min$^{-1}$), C(t) is the difference between the initial and effluent sorbate concentrations (mg L$^{-1}$) at time t (min), and m is the mass of the dry sorbent media used in the packed-bed column (g dry media).

Comparison of the media performance for simultaneous removal of two contaminants was conducted by estimating the Simultaneous Removal Capacity (SRC) index as summarized in Eq. (2):

$$SRC = (\text{Combined Capacity}) \times (\text{Weighting Factor}) \quad (2)$$

where Combined Capacity represents an average of the removal capacities (q) for each individual pollutant as defined in Eq. (3):

$$\text{Combined Capacity} = \sqrt{q(F)^2 + q(NO_3-N)^2} \quad (3)$$

and Weighting Factor is a component that attributes higher scores to media with similar removal capacity for both pollutants over sorbents with preferential removal capacity (Eq. (4)):

$$\text{Weighting Factor} = \sin\left(2 \times \tan^{-1}\frac{q(F)}{q(NO_3-N)}\right) \quad (4)$$

Considering that simple water matrix does not account for reduced performance as a result of competing ions, which are only present in realistic water matrices, the SRC was estimated only for the $q_{95}\%$ obtained with the complex water matrix.

Figure 3:
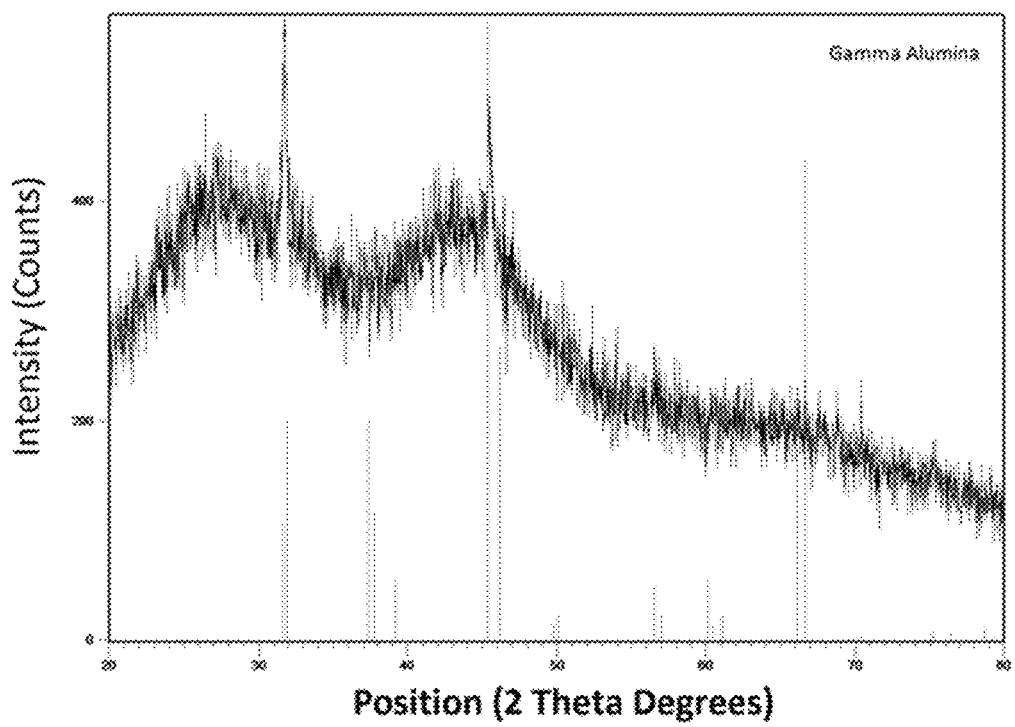
FIG. 3 shows an X-ray diffraction spectrum of powder aluminum (hydr)oxide formed in strong base ion-exchange media.

FIG. 3 shows an X-ray diffraction (XRD) spectrum of powder aluminum (hydr)oxide, suggesting that a mix of $\gamma$-Al$_2$O$_3$ and amorphous aluminum (hydr)oxide can be obtained by reducing aluminum ion precursors with borohydride, followed by exposure to environmental oxygen. The broad diffraction lines, which typically stem from lattice distortions or defects and are generally attributed to amorphous phase of obtained media, prevented quantification of each phase. Although it is likely that the formed aluminum material contains amorphous AlOOH, it is unlikely that any Al(OH)$_3$ (s) is present because the obtained material remained stable at pH~3 and pH>12.

The synthesized powder aluminum (hydr)oxide material exhibited an iso-electric point of pH$_{PZC}$~8.5. This value corresponds well with the pH$_{PZC}$~8 measured for the commercial activated alumina used in this experiment and reported values reported for $\gamma$-Al$_2$O$_3$, which range between 8 and 9. The higher iso-electric point of the aluminum (hydr)oxide material contributed to the overall iso-electric point of the hybrid media, which increased from pH$_{PZC}$~4.7 to pH$_{PZC}$~5.3 for the virgin ion-exchange and hybrid media, respectively. As summarized in Table 1, the iso-electric point was the same for both hybrid media, although Al-HIX-4, which was fabricated via the second synthesis approach, exhibited almost twice as much aluminum than the Al-HIX-2.

TABLE 1

Aluminum content, pore properties, specific surface area, and point of zero charge of tested media

| Media | Al Content (%) | Particle porosity $\varepsilon_P$(%) | Bulk density[a] (g L$^{-1}$) | BET surface area (m$^2$ g$^{-1}$) | Pore volume (cm$^3$ g$^{-1}$) | pH$_{PZC}$ |
|---|---|---|---|---|---|---|
| IX | 0.00 | 77 | 377.6 | 7.15 | 0.016[b] | 4.7 |
| Al-HIX-2 | 2.12 | 72 | 386.4 | 23.09 | 0.047[b] | 5.3 |
| Al-HIX-4 | 3.70 | 64 | 398.3 | 14.97 | 0.027[b] | 5.3 |
| AA | 52.91 | 78 | 808.3 | 237[c] | 0.33[c] | 8.0 |

[a]Expressed per dry media
[b]BJH Desorption cumulative volume of pores between 1.7 nm and 300 nm width
[c]Hao, J., Han, M.-J., Meng, X., 2009. Preparation and evaluation of thiol-functionalized activated alumina for arsenite removal from water. J. Haz. Mat. 167, 1215-1221.

The increase in pH$_{PZC}$ due to impregnation of IX with aluminum (hydr)oxide consequently resulted in increasing of net positive surface charge of hybrid Al-HIX media for 4 times. The ~3.7% Al in Al-HIX-4 yielded ~13.08 μmol m$^{-2}$ of new positive surface charges, while the ~2.1% Al in Al-HIX-2 yielded ~9.45 μmol m$^{-2}$. The estimated higher increase in net positive surface charge density of the Al-HIX-4, when compared to its Al-HIX-2 counterpart, stemmed from lower surface area of the Al-HIX-4 media and was insufficient to cause any differentiating change in the iso-electric point. As summarized in Table 1, surface area increased almost three-fold with the introduction of ~2.1% aluminum in Al-HIX-2 compared to virgin IX resin. This could be attributed to new surface area generated by the aluminum (hydr)oxide inside the pores of the media. Interestingly, increasing aluminum from ~2.1% to ~3.7% decreased the specific surface area, but the specific surface area of Al-HIX-4 remained larger than the virgin IX media. In contrast, the reported specific surface area of activated alumina (AA) is significantly higher (Table 1).

The gain in the specific surface area of both hybrid media due to the increase in aluminum content reduced particle porosity. The particle porosity of the media decreased from $\varepsilon_P$≈77% for the virgin IX to $\varepsilon_P$≈72% and $\varepsilon_P$≈64% for the Al-HIX-2 and Al-HIX-4 media, respectively. These values are comparable with particle porosity for activated alumina of $\varepsilon_P$≈78%.

Figure 4:
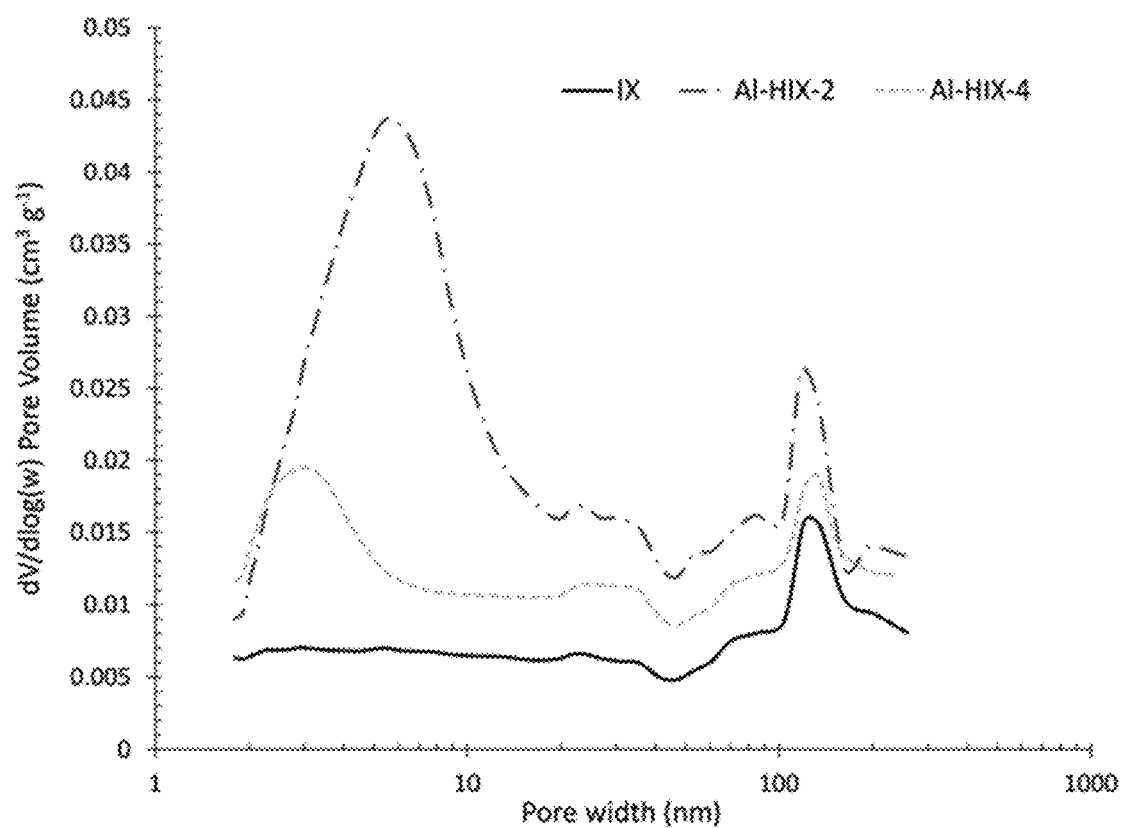
FIG. 4 shows BJH differential adsorption pore volume distribution for virgin IX and hybrid Al-HIX media.

The cumulative pore volume also followed the trend exhibited by the media's specific surface area. According to the BJH model analysis, which is summarized in Table 1, the cumulative pore volume between 1.7 nm and 300 nm initially increased from 0.016 cm$^3$ g$^{-1}$ to 0.047 cm$^3$ g$^{-1}$ with the increase in aluminum content to ~2.1%, and then it decreased to 0.027 cm$^3$ g$^{-1}$ when aluminum content increased to ~3.7%. This corresponds well with the specific surface area trend because the majority of the new pore volume is created in a mesoporous region below 20 nm, which is the main contributor of high surface area together with the microporous region. Interestingly, it is not only the <20 nm region that is characterized by greater pore volume, but the entire region <300 nm exhibited increases in the respective cumulative pore volumes by a factor of 2 to 3. FIG. 4 shows BJH differential adsorption pore volume for virgin IX and hybrid Al-HIX media. As illustrated in FIG. 4, it could be postulated that the resin macropore volume for $d_{Pore}$>300 nm is probably being reduced by the aluminum (hydr)oxide deposition to the benefit of new surface area and volume formation in the mesopore and low macropore regions.

The changes in pore volume and surface were not readily observed with the SEM technique. Discrete nanoparticles of aluminum (hydr)oxide could not be identified by the backscatter detector because of relatively small differences in atomic masses between the low atomic mass elements (carbon, nitrogen, and oxygen) in the polymer resin and the aluminum. However, as the aluminum content increased, smoothing of the surfaces within the pores ion-exchange media was observed, which could be attributed to the formation of aluminum (hydr)oxide nano-films. This pore morphology trend was observed throughout the entire depth of the examined media, suggesting the even distribution of the aluminum inside the resin particles, which was confirmed by energy dispersive X-ray elemental mapping microanalysis.

Figure 5A:
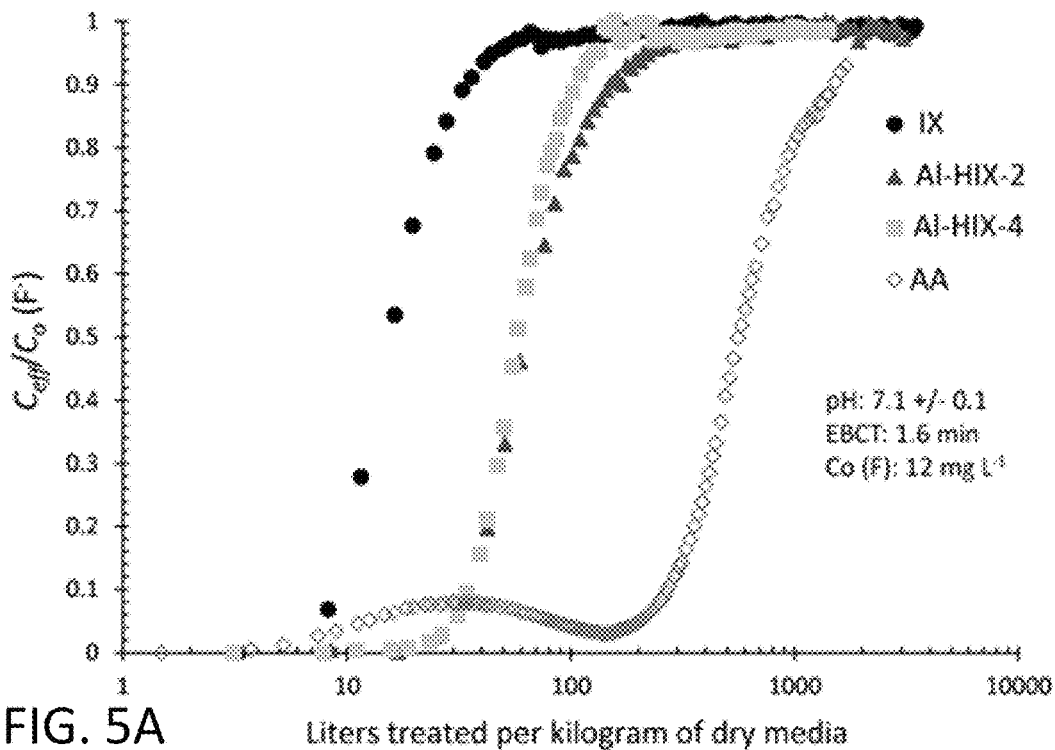
FIGS. 5A and 5B show column test breakthrough curves for fluoride removal in simple water matrices expressed as liters treated per kilogram of dry media and aluminum, respectively.
Figure 5B:
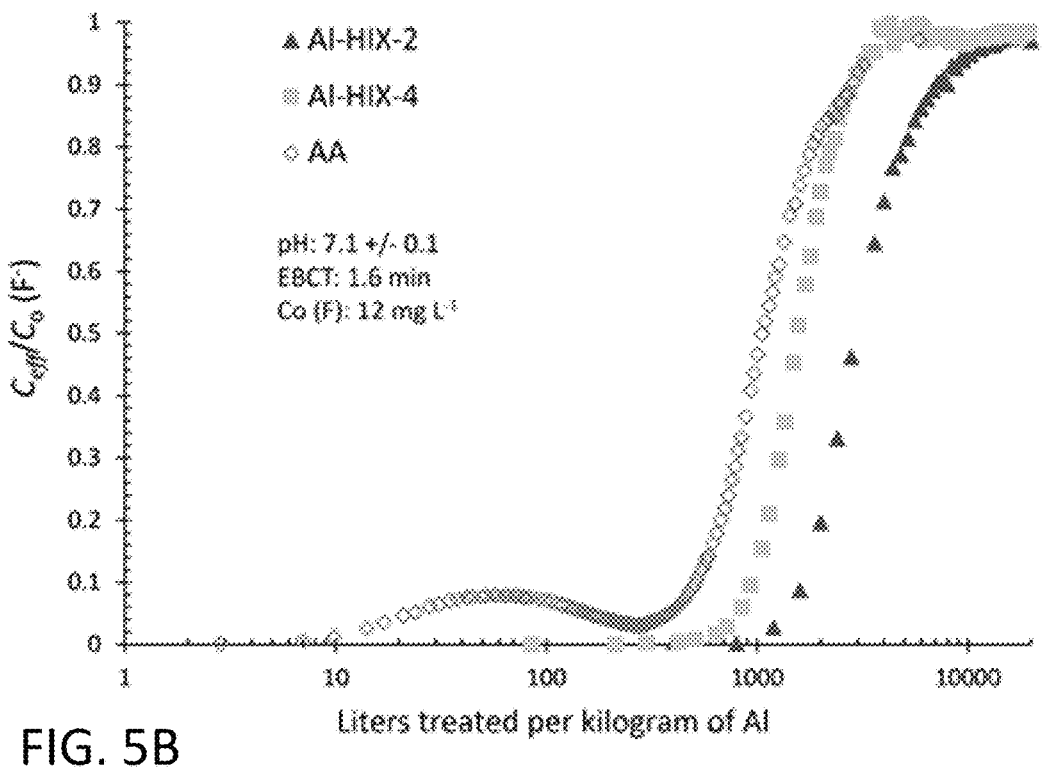

FIGS. 5A and 5B illustrate breakthrough curves for fluoride removal by the activated alumina and both the virgin and hybrid ion-exchange types of media in a simple water matrix (i.e., no competing ions). As depicted in FIG. 5A, ~45 L of water could be treated per kilogram of dry virgin IX media until the column reached 95% exhaustion. The addition of 2.1% aluminum as aluminum (hydr)oxide into the pores of the IX media (Al-HIX-2) significantly improved the fluoride removal as this media was able to treat ~200 L of water per kilogram of dry media before 95% breakthrough was reached. The fluoride removal performance of the media slightly decreased with increase in aluminum content from 2.1% to 3.7%. As illustrated in FIG. 5A, the Al-HIX-4 was able to treat ~130 L of simple water per kilogram of dry media until fluoride breakthrough exhibited 95%. Although both Al-HIX media performed the same until 50% breakthrough was reached, it appears that the lower particle porosity of the Al-HIX-4 media may have contributed to a mass-transport induced decrease in this media's performance. As illustrated by the shapes of the Al-HIX curves above 70% breakthrough, faster fluoride intraparticle mass transport was exhibited by the Al-HIX-2. Considering changes in media properties induced by aluminum content shown in Table 1, it can be suspected that lowering the particle porosity and the subsequent increase of media tortuosity dominantly reduced pore diffusivity of fluoride.

The commercially-available activated alumina media outperformed the Al-HIX media for fluoride removal by a factor of >10. When normalized on basis of mass dry media, a kilogram of activated alumina was able to treat ~2,000 L of fluoride from simple matrix until 95% breakthrough was achieved. This is not surprising considering that activated alumina has a much higher content of aluminum per unit dry media. When the breakthrough curves were compared on basis of volume of water treated per mass of aluminum in the media, the performance trend reversed. The activated alumina removed slightly less fluoride than the two Al-HIX hybrid media. As illustrated in FIG. 5B, activated alumina could treat ~3,500 L of simple water matrix water per kilogram of Al, which was lower than, but comparable to, the performance of the Al-HIX-4 media. In contrast, the Al-HIX-2 media could treat ~10,000 L of simple water per kilogram of Al, which implies better utilization of the aluminum (hydr)oxide surface for removal of fluoride than activated alumina.

Figure 6A:
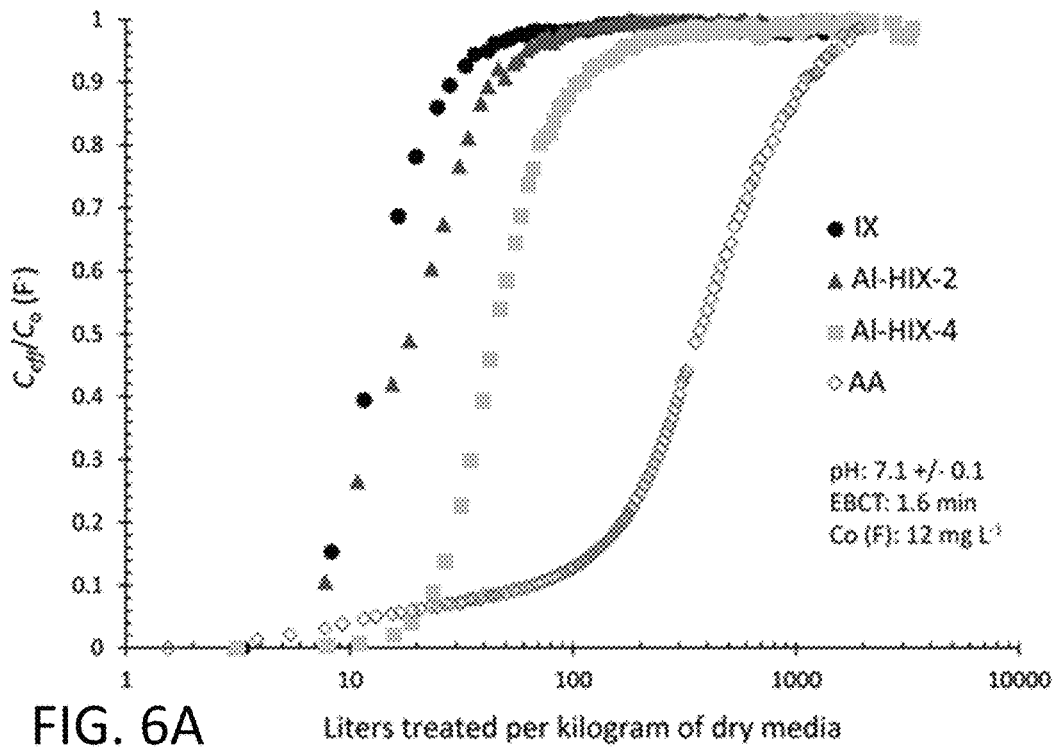
FIGS. 6A and 6B show column test breakthrough curves for fluoride removal in complex water matrices expressed as liters treated per kilogram of dry media and aluminum, respectively.
Figure 6B:
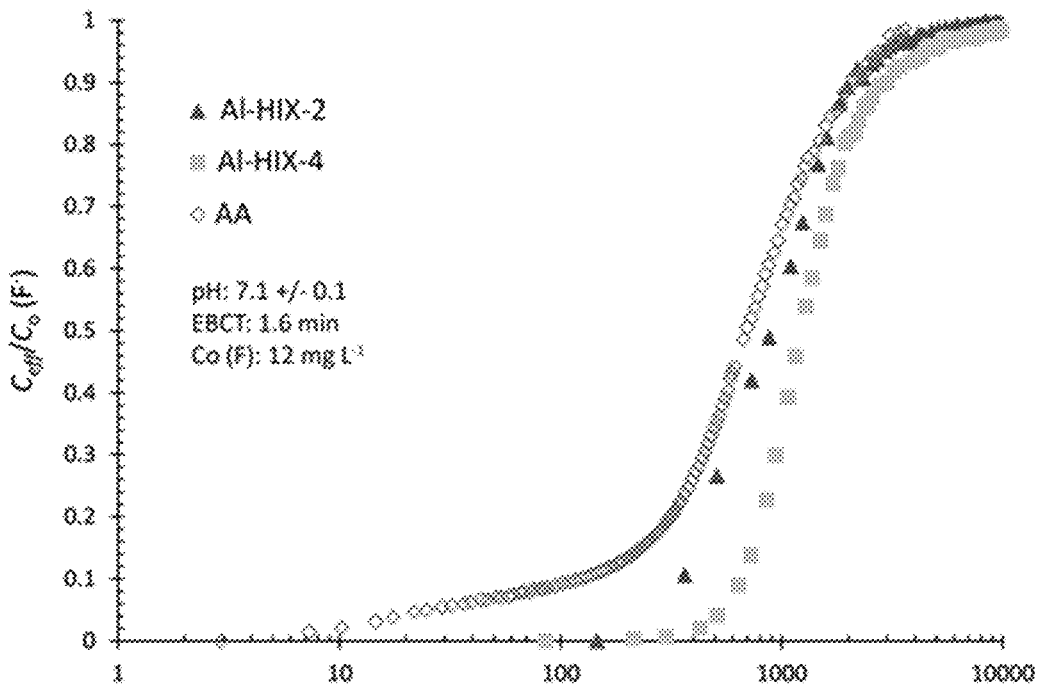

The presence of co-competing ions in the complex matrix had a differentiating effect on the fluoride removal performance of Al-HIX media. The extent of co-competing ions influence on media performance in continuous-flow system is directly related to ionic: (1) affinity toward media's active sites; (2) concentration; and (3) size. Therefore, it is believed that in the presence of co-competing ions, due to selectivity issues, target contaminant removal decreases. This trend was observed where fluoride removal performance of the Al-HIX-2 media decreased from ~200 L/kg of dry media for simple water to ~65 L/kg of dry media for the complex water matrix before 95% breakthrough was observed. The fluoride removal performance of Al-HIX-4 exhibited an opposite trend and was enhanced by the presence of co-contaminants in the complex water matrix. Specifically, this media was able to treat ~190 L of complex water matrix per kilogram of dry media until 95% of fluoride breakthrough was achieved, which represented an increase of 60 L/kg of dry media as illustrated in FIG. 6A. Virgin IX media, on the other hand, retained fluoride removal of 45 L/kg of dry media even in the complex water matrix. This unexpected trend may be explained by quaternary amines in IX media, which may be in pores that restrict access to larger oxyanions (e.g., nitrate and sulfate), are still available for fluoride ion-exchanging to occur. Although the sum of ionic radius and hydrated shell width of fluoride, nitrate, and sulfate are close to each other (0.212, 0.223 and 0.273 nm, respectively), the difference can be a limiting factor for its diffusion in micro and small mesopores. As small amounts of aluminum (hydr)oxide are introduced, these inaccessible ion-exchange groups may be masked by the aluminum (hydr)oxide, which becomes the main sorbent for the fluoride ions, but it does not provide sufficiently large sorption capacity in presence of competing ions. With an increase in aluminum content, the number of available sorption sites increases significantly, improving fluoride sorption capacity and also accommodating co-contaminant removal, as shown in FIG. 6B.

Figure 7:
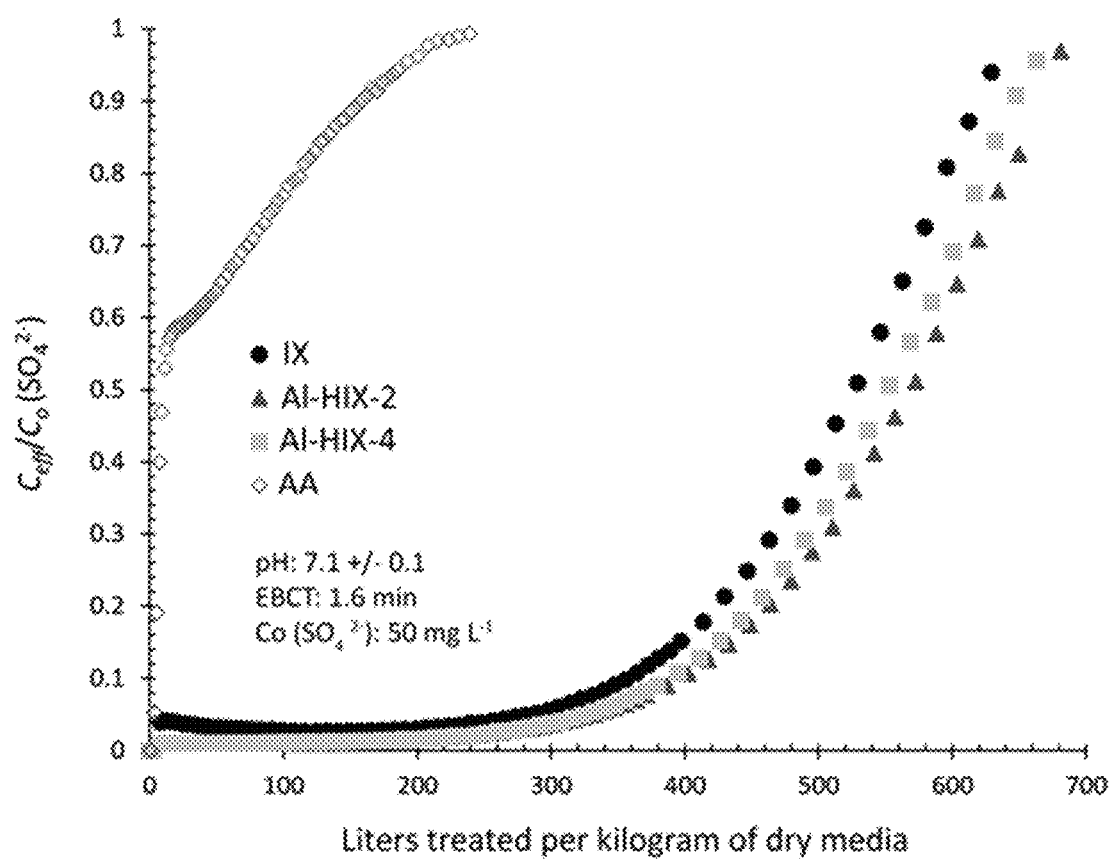
FIG. 7 shows column test breakthrough curves for sulfate removal in complex water matrices.

Based on FIG. 7, which shows that activated alumina has the ability to partially remove sulfate from complex water matrix in addition to fluoride, it could be postulated that sulfate ($C_o$~50 mg L$^{-1}$) may partially compete with fluoride for some of the aluminum (hydr)oxide sites. For strong base virgin ion-exchange resin, sulfate removal is expected because the quaternary amine ion-exchange groups are especially designed and positioned to remove strong acid oxyanions. However, sulfate removal increased with addition of aluminum (hydr)oxide content as shown in FIG. 7. The Al-HIX-2, exhibited slightly higher sulfate removal performance than its Al-HIX-4 counterpart. This trend further supports the conjecture that low aluminum (hydr)oxide contents may primarily mask the quaternary amine groups that are generally available only to fluoride. Any additional increase of aluminum (hydr)oxide content, however, appears to mitigate this effect by taking over the fluoride removal pathway.

Figure 8A:
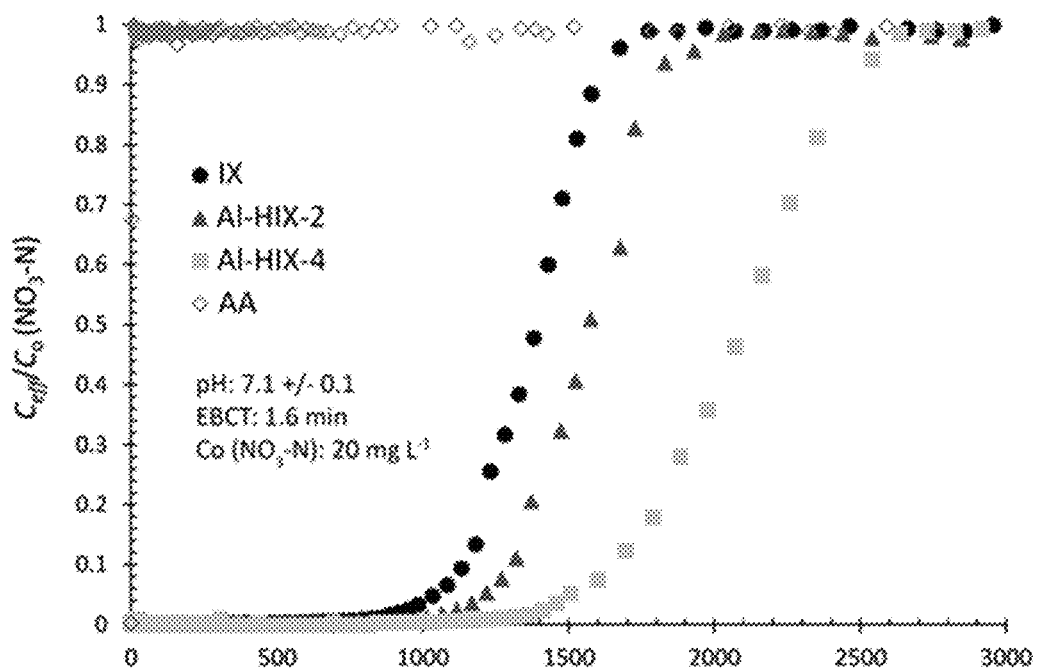
FIGS. 8A and 8B show column test breakthrough curves for nitrate removal in simple and complex water matrices, respectively.
Figure 8B:
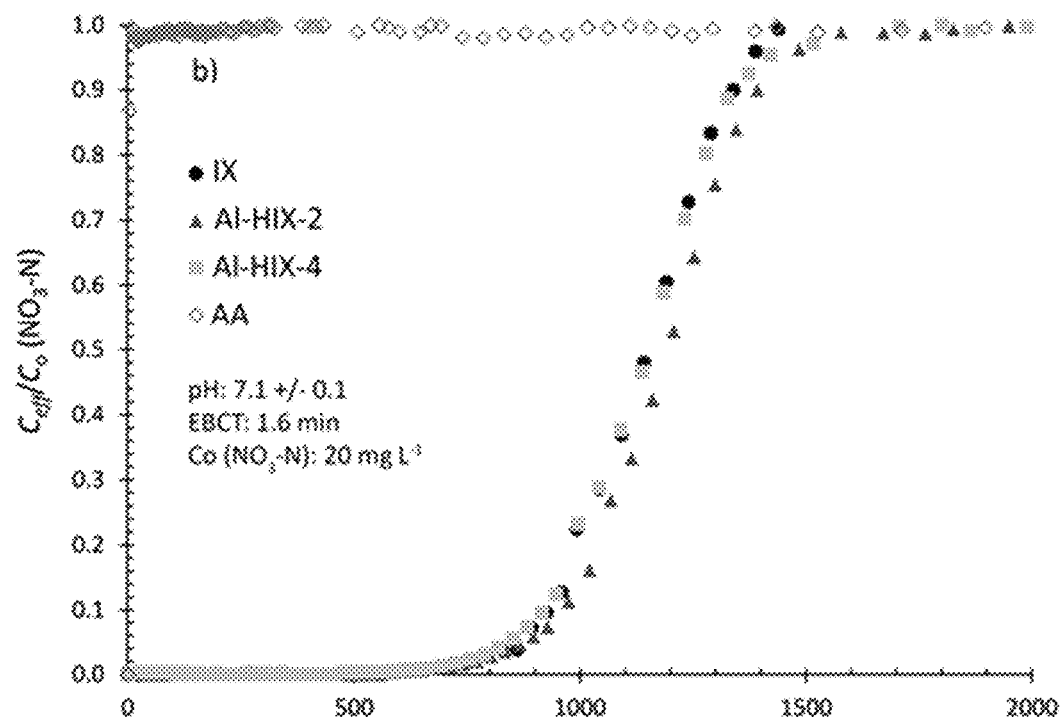

As illustrated in FIGS. 8A and 8B, activated alumina did not remove nitrate in either water matrix. However, the addition of aluminum (hydr)oxide appears to increase the performance of the ion-exchange media as illustrated in FIG. 8A for the simple water matrix. Strong base ion-exchange resin was able to remove nitrate from ~1,600 L of simple water per kilogram of dry media until 95% of $NO_3$—N breakthrough was reached. With addition of 2.1% and 3.7% of aluminum (hydr)oxide inside the pores of the media, these values increased to 1,900 L and 2,600 L/kg of dry media, respectively. This improved performance could be attributed to two factors: (1) modification of the steric effects (i.e., minimization of steric effect influence); and (2) increase in positive surface charge, which reduces the electrostatic repulsion between the surface and oxyanion. This effect appears to be suppressed by the competing ions, which are present in the complex water matrix. As illustrated in FIG. 8B, the nitrate removal breakthrough curves of all ion-exchange media appear to be almost identical. This could be attributed to the presence of sulfate, which competes with nitrate for the available ion-exchange sites. As illustrated in FIG. 7, the effect associated with improved removal of nitrate in simple water appears to be manifested for the sulfate, suggesting that sulfate's greater affinity for the ion-exchange sites over nitrate may be the underlying cause for this behavior.

Figure 9:
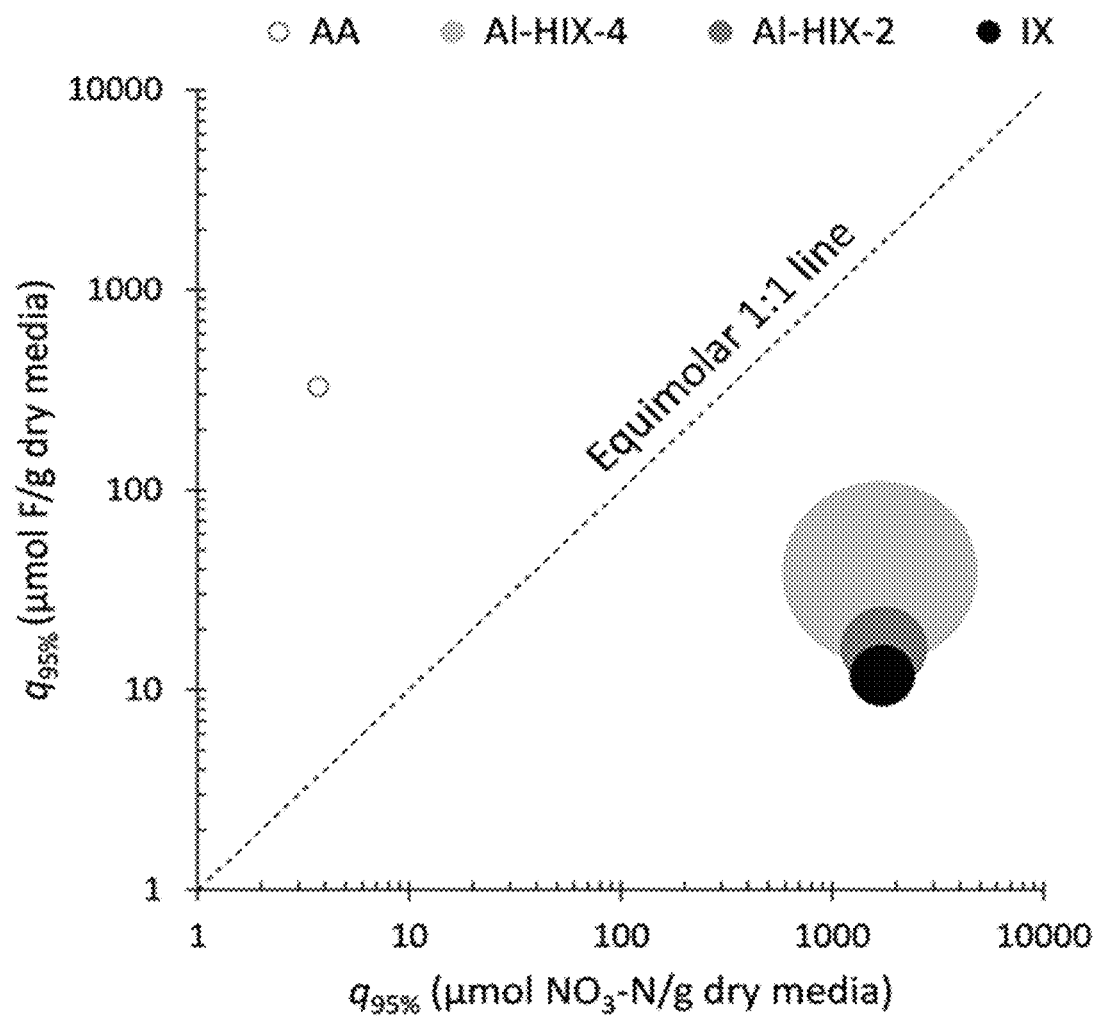
FIG. 9 is a graphical illustration of simultaneous removal capacity (SRC) indices; with the dashed line indicating an equimolar capacity for both pollutants. Symbol size is proportional to SRC intensity.

FIG. 9 illustrates the relation between single sorption capacity calculated from column tests at $C_{eff}/C_o$=95% saturation in complex water matrix. For fluoride removal, the media capacity follows an expected trend, which is closely associated with the aluminum content. For nitrate removal, there was no significant difference between virgin IX or Al-HIX hybrid media, but AA did not exhibit almost any nitrate removal abilities. Further calculation of combined capacity and weighting factor led to SRC indices summarized in Table 2. The Al-HIX-4 media exhibited the highest SRC index that was more than 2 times higher than the one for Al-HIX-2. This suggests that Al-HIX-4 may be more suitable for hybrid sorbent packed-bed configurations in groundwater that resembles similar water chemistry as the complex water matrix used in this study.

TABLE 2

Sorbents ranking based on SRC indices for maximum single sorption capacity values estimated in column tests at $C_{eff}/C_o$ = 95% for complex water matrix

| Media | $q_{95\%}$ (μmol F g$^{-1}$ dry media) | $q_{95\%}$ (μmol NO$_3$—N g$^{-1}$ dry media) | Combined capacity | Weighting factor | SRC (μmol g$^{-1}$) |
|---|---|---|---|---|---|
| IX | 11.81 | 1,721.40 | 1721.44 | 0.014 | 23.62 |
| Al-HIX-2 | 16.22 | 1,752.90 | 1752.98 | 0.019 | 32.44 |
| Al-HIX-4 | 38.56 | 1,674.80 | 1675.24 | 0.046 | 77.10 |
| AA | 327.55 | 3.70 | 327.57 | 0.023 | 7.40 |

A number of embodiments have been described. Nevertheless, it will be understood that various modifications may be made without departing from the spirit and scope of the disclosure. Accordingly, other embodiments are within the scope of the following claims.

What is claimed is:

1. A method of preparing a porous hybrid media, the method comprising:
   contacting porous media with an aqueous solution comprising aluminum ions to yield a mixture;
   adjusting a pH of the mixture to form a floc comprising aluminum hydroxide;
   removing liquid from the mixture to yield aluminum hydroxide-containing porous media;
   contacting the aluminum hydroxide-containing porous media with a reducing agent to yield a porous hybrid media comprising aluminum hydr(oxide) impregnated in the porous media.

2. The method of claim 1, wherein the aluminum ions are derived from aluminum chloride.

3. The method of claim 1, wherein the reducing agent comprises borohydride.

4. The method of claim 1, wherein adjusting the pH of the mixture comprises increasing the pH of the mixture to less than 6.

5. The method of claim 4, wherein adjusting the pH of the mixture further comprises, after increasing the pH of the mixture to less than 6, increasing the pH of the mixture to greater than 6 and less than 8.

6. The method of claim 1, wherein preparing the porous hybrid media occurs at room temperature or a temperature less than about 40° C.

7. The method of claim 1, the porous media comprises strong base ion-exchange media.

8. The method of claim 1, wherein an aluminum content of the porous hybrid media is between 3 wt % and 4 wt %.

9. The method of claim 1, wherein the aluminum hydr (oxide) comprises γ-Al$_2$O$_3$, amorphous Al$_2$O$_3$, amorphous AlO(OH), or a combination thereof.

* * * * *